United States Patent [19]

Kolchinsky

[11] Patent Number: 5,205,531

[45] Date of Patent: Apr. 27, 1993

[54] SOLENOID OPERATED CARTRIDGE VALVE

[75] Inventor: Abel E. Kolchinsky, Riverwoods, Ill.

[73] Assignee: Sterling Hydraulics, Inc., Schaumburg, Ill.

[21] Appl. No.: 865,927

[22] Filed: Apr. 9, 1992

[51] Int. Cl.⁵ .................. F16K 31/40; F16K 31/42
[52] U.S. Cl. .................... 251/30.04; 251/38; 251/129.15; 335/262; 335/278
[58] Field of Search ........... 251/30.02, 30.03, 30.04, 251/30.05, 38, 44, 45, 46, 129.15; 335/255, 261, 267, 278, 281

[56] References Cited

U.S. PATENT DOCUMENTS

| | | | |
|---|---|---|---|
| 3,405,906 | 10/1968 | Keller | 251/30.04 |
| 4,304,264 | 12/1981 | McClintock et al. | 251/30.04 |
| 4,526,340 | 7/1985 | Kolchinsky et al. | 251/38 |
| 4,540,154 | 9/1985 | Kolchinsky et al. | 251/129.15 |
| 4,725,039 | 2/1988 | Kolchinsky | 251/129.15 |
| 4,746,093 | 5/1988 | Scanderbeg | 251/30.04 |
| 4,995,586 | 2/1991 | Gensberger et al. | 251/30.04 |
| 5,002,253 | 3/1991 | Kolchinsky et al. | 251/30.03 |

*Primary Examiner*—George L. Walton
*Attorney, Agent, or Firm*—Wood, Phillips, Van Santen, Hoffman & Ertel

[57] ABSTRACT

A lower cost valve results from the use of a single machined part for a valve housing. The housing is made of a non-magnetic material which can be less expensive and eliminates the requirement for screens or filters in automotive applications. A threadable connection connects a tube stop to the valve housing eliminating the requirement of braising in manufacturing. Finally, a one-piece plunger and pilot valve with a high guiding length minimizes tilting of the pilot. The one-piece housing allows for one common bore for guiding the plunger with the pilot and the poppet. The two ideal concentric surfaces make the poppet outer diameter concentric to the pilot hole.

20 Claims, 2 Drawing Sheets

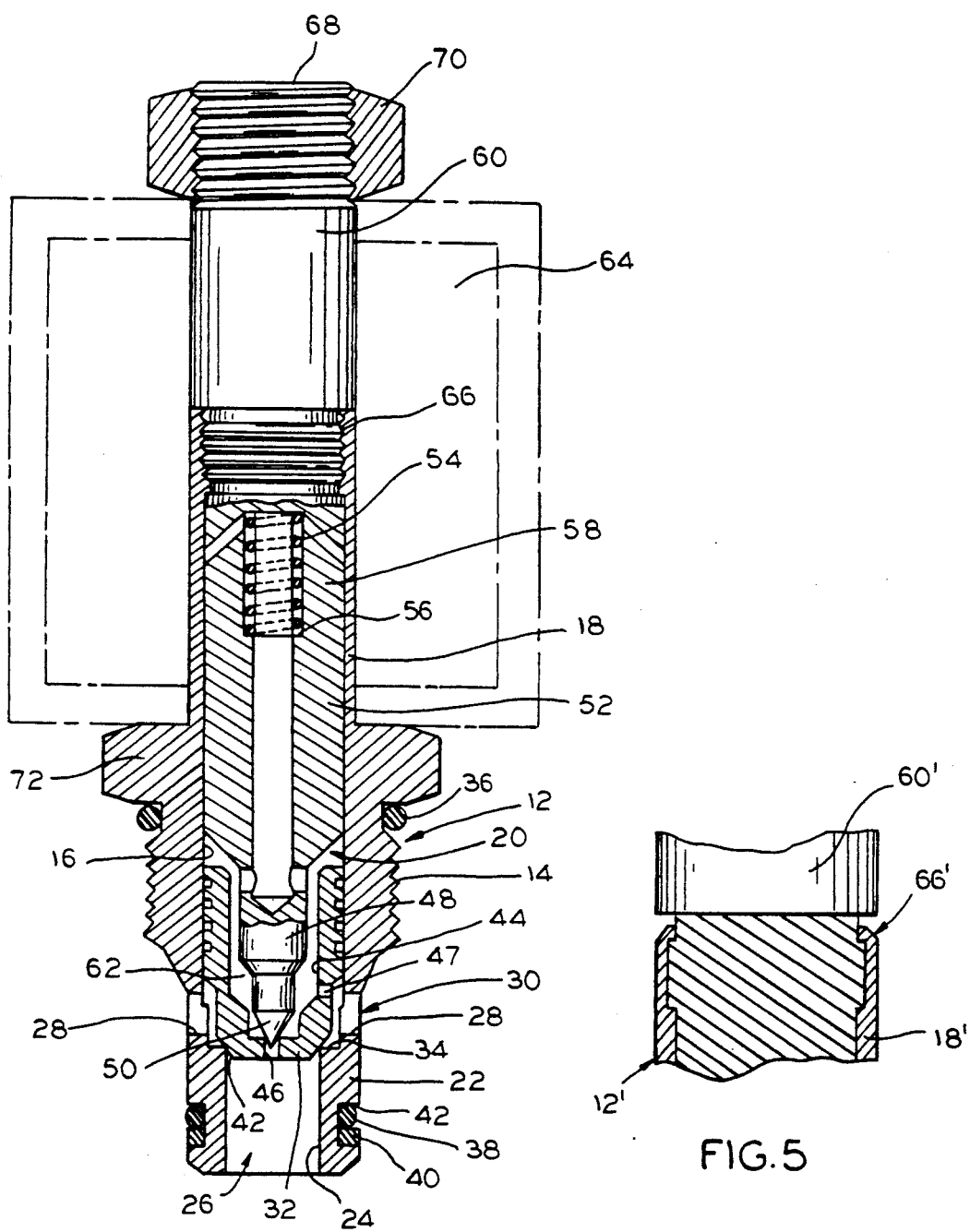

SOLENOID OPERATED CARTRIDGE VALVE

FIELD OF THE INVENTION

This invention relates to valves and, more particularly, to a two-position solenoid operated cartridge valve.

BACKGROUND OF THE INVENTION

In one form of a fluid flow control valve, a flow control element or valve member is movably positioned in a valve chamber between first and second valve positions for selectively fluidically coupling valve ports. The flow control element may be directly actuated by a solenoid operated plunger operatively associated with the flow control element. Alternatively, the flow control element may be actuated by a pilot valve which is directly actuated by a solenoid operated plunger. In either instance, the solenoid controllably positions the plunger to move either the flow control element to an actuated position or the pilot valve to an actuated position to allow movement of the valve member.

Typically, the valve chamber is provided by a two-piece valve housing of a magnetic material capable of withstanding high fluid pressure. The plunger is slidably received in a sleeve braised between the valve housing and a tube stop. To bias the plunger to a normal or an actuated position, the plunger typically includes a counterbore at either end receiving a spring biasing the plunger in a suitable direction. This type of assembly requires increased manufacturing cost. Also, misalignment can occur while braising the sleeve to the tube housing.

A typical application for a cartridge valve of the two position type is in an automobile transmission for switching clutches and the like. Typically, the clutches are single acting cylinders operated at relatively low pressure on the order of 500–600 psi, with 1,000 psi being maximum. As a plurality of valves may be necessary in such applications, economies in manufacturing are desirable to provide cost effective solutions to satisfy control requirements.

In higher pressure applications, a poppet type cartridge valve is required. With such a valve the poppet has a pilot hole and an orifice. It is necessary to catch the pilot valve in the pilot hole. As such, it must be properly guided and therefore must be concentric in the poppet bore. Also, the pilot is conventionally connected to the plunger with a pin which allows for floating of the two parts relative to one another. This further makes it more difficult to provide the required centering of the pilot valve relative to the pilot hole.

An additional problem in automotive applications results from the use of cartridge valves having magnetic housings. In an automotive transmission box, metallic chips and the like may result from gear wearout. Energization of the solenoid in proximity to a magnetic valve housing attracts the chips, causing valve sticking problems. This problem can be minimized using filters or screens in valve manifolds or the like. Here, again, additional parts and expense results.

The present invention overcomes one or more of the problems discussed above.

SUMMARY OF THE INVENTION

According to the invention, a cartridge valve is provided which can be manufactured for relatively low cost.

It is one object of the invention to provide a cartridge valve including a one-piece valve housing.

It is another object of the invention to provide a cartridge valve using a one-piece pilot and plunger guided in a common bore.

Broadly, there is disclosed herein a solenoid operated cartridge valve comprising an elongate one-piece cylindrical valve housing having an axial throughbore defining an interior chamber, one end of the housing comprising a port end including a plurality of port openings, and an axial opposite end comprising a sleeve end receivable in a solenoid, in use. A valve member is movable in the chamber at the port end between first and second valve positions for selectively coupling the port openings, the valve member having an axial pilot throughbore defining a pilot chamber. A solenoid plunger is movable in the interior chamber at the sleeve end. A pilot valve is movable in the pilot chamber for selectively opening or closing the pilot throughbore. Means are provided for coupling the pilot valve to the plunger for axial movement therewith for selectively positioning the pilot valve, and thus also the valve member. A stop is mounted to the valve housing at the sleeve end for retaining the plunger in the chamber. Biasing means are operatively associated with the plunger for normally maintaining the valve member in one of the first and second valve positions.

It is a feature of the invention that the coupling means comprises the plunger being integral with the pilot valve.

It is another feature of the invention that the pilot through opening comprises a relatively large diameter counterbore opening into the chamber coupled to a relatively small diameter coaxial pilot hole adjacent the housing port end.

It is a further feature of the invention that the pilot valve is loosely received in the counterbore and the pilot valve has a needle end received in the pilot hole for selectively opening or closing the pilot hole.

It is still another feature of the invention that the plunger is an elongate plunger having an outer diameter slightly less than an inner diameter of the housing throughbore to maintain the plunger centered in the valve housing so that the pilot valve needle end is concentric with the pilot hole.

It is yet another feature of the invention that the valve housing is of a non-magnetic material.

It is still an additional feature of the invention that the biasing means comprises a spring received in the chamber and acting between the stop and the plunger for normally maintaining the valve member in one of the first and second valve positions.

It is still an additional feature of the invention that the stop is threadably mounted to the valve housing at the sleeve end.

It is yet another feature of the invention that the stop is swaged to the valve housing at the sleeve end.

It is still yet a further feature of the invention that the pilot through opening is concentric with an outer diameter of the valve member.

In accordance with another aspect of the invention there is disclosed herein an elongate one-piece cylindrical valve housing having an axial counterbore at a sleeve end defining an interior chamber, an axial opposite port end of the housing having an axial throughbore opening to the interior chamber to provide an end port opening and defining a valve seat, and a radially extending through opening in the housing opening in the said interior chamber and defining a side port opening, the sleeve end being receivable in a solenoid, in use. A valve member is movable in the chamber between a first valve position seated on the valve seat for selectively preventing coupling between the end and side port openings, and a second valve position spaced from the valve seat for coupling the end and side port openings, the valve member having an axial pilot throughbore defining a pilot chamber. A solenoid plunger is movable in the interior chamber at the sleeve end. A pilot valve is movable in the pilot chamber for selectively opening or closing the pilot throughbore. Means are provided for coupling the pilot valve to the plunger for axial movement therewith for selectively positioning the pilot valve, and thus also the valve member. A stop is mounted to the valve housing at the sleeve end for retaining the plunger in the chamber. Biasing means are operatively associated with the plunger for normally maintaining the valve member in one of the first and second valve positions.

In accordance with the invention, a lower cost valve results from the use of a single machined part for the valve housing. Moreover, the housing is made of a non-magnetic material which can be less expensive and eliminates the requirement for screens or filters in automotive applications. Similarly, threadably connecting the tube stop to the valve housing sleeve end eliminates the requirement of braising in manufacturing. Finally, providing a one-piece plunger and pilot valve with a high guiding length minimizes tilting of the pilot. Further, the one-piece housing allows for one common bore for guiding the plunger with the pilot and the poppet. The two ideal concentric surfaces make the poppet outer diameter concentric to the pilot hole.

Further features and advantages of the invention will readily be apparent from the specification and from the drawings.

BRIEF DESCRIPTION OF THE DRAWING

FIG. 4 is a sectional view taken along the line 4—4 of FIG. 1; and

FIG. 5, is a partial sectional view similar to FIG. 4 for an alternative embodiment.

DETAILED DESCRIPTION OF THE INVENTION

Figure 1:
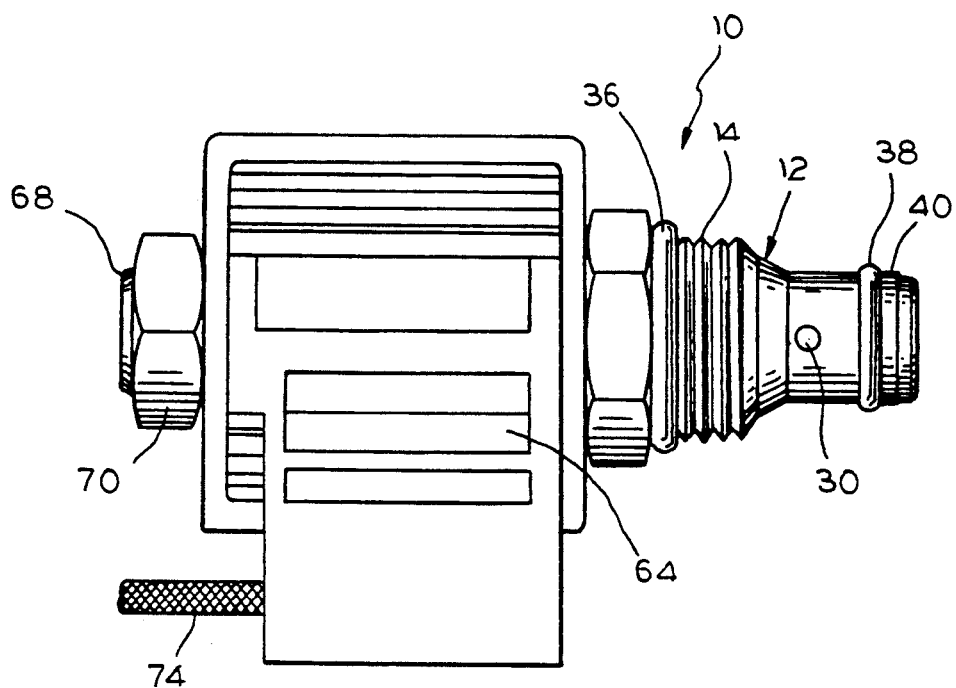
FIG. 1 is a perspective view of a solenoid operated cartridge valve according to the invention.

FIG. 1 illustrates a solenoid operated cartridge valve 10 according to the invention. The valve 10 includes a stationary valve housing 12 having a threaded outer portion 14 adapted to be threaded into a fluid port (not shown).

Figure 2:
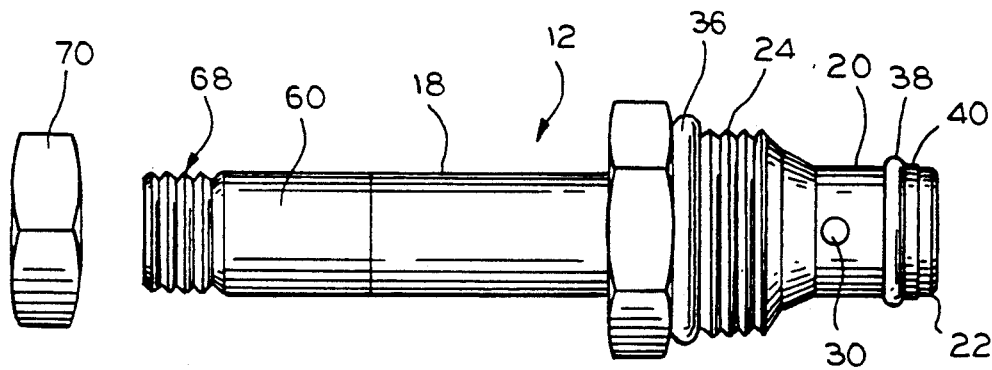
FIG. 2 is an exploded view of the valve of FIG. 1 with the solenoid removed.

With reference also to FIGS. 2 and 4, the valve housing 12 is of elongate, one-piece cylindrical construction having an axial counterbore 16 at a sleeve end 18 defining an interior chamber 20. An axially opposite housing port end 22 has an axial throughbore 24 opening to the interior chamber 20 to provide an end port opening 26.

A plurality of radially extending through openings 28 in the housing 12 open into the interior chamber 20 and define side ports 30. The end port 26 is selectively opened or closed by a valve member, or poppet, 32 seating on an annular valve seat 34 where the throughbore 24 opens into the interior chamber 20.

First and second sealing rings 36 and 38 are provided on the valve housing 12 for sealing the valve assembly within the fluid port. A backup ring 40 is associated with the sealing ring 38 in a suitably outwardly opening, annular recess 42 of the valve housing 12.

As used herein, the relative term "outer" or "outward" refers to a direction axially toward the port end 22, and the relative term "inner" or "inward" refers to a direction axially away from the port end 22, i.e. axially toward the sleeve end 18.

When the valve 10 is installed in a suitable fluid port, fluid pressure between the seals 36 and 38 is applied through the side ports 30 against the poppet 32. In the illustrated embodiment, the poppet 32 has an outer seating portion 42 engaging the valve seat 34. The poppet 32 is movable in the interior chamber 20 between a first valve position as shown seated on the valve seat 34 for selectively preventing coupling between the end port 26 and the side port 30, and a second valve position, not shown, spaced from the valve seat 34 for fluidically coupling the end port 26 with the side ports 30.

The poppet 32 has an outer diameter slightly less than an inner diameter of the chamber 20 so that it is slidable therein with minimal tilting. The poppet 32 has an enlarged counterbore 44 opening inwardly and a smaller diameter coaxial pilot hole 46 concentrically positioned in the interior chamber 20. An orifice 47 is provided through the sidewall of the poppet 32.

The pilot hole 46 is normally closed by a pilot valve 48 releasably received in the poppet counterbore 44 and having a needle end 50 for selectively opening or closing the pilot hole 46.

The pilot valve 48 is integrally formed with a solenoid plunger 52 axially movable in the interior chamber 20 at the sleeve end 18. Particularly, the plunger 52 is coaxial with the pilot valve 48 and is positioned inwardly relative thereto. The plunger 18 is elongate in construction and has an outer diameter slightly less than an inner diameter of the interior chamber 20 to maintain the plunger 52 centered in the chamber 20. The pilot valve 48, being integral with the plunger 52, is guided in the same bore, i.e., the interior chamber 20, as is the plunger. As a result, the pilot valve needle end 50 is concentric with the pilot hole 46, eliminating the requirement for a guiding hole for the pilot valve needle end 50. The high guiding length of the plunger minimizes tilting of the pilot valve 48, as is apparent.

The use of a common bore 16 for both the pilot valve 48 and the plunger 52 simplifies construction while avoiding misalignment problems.

In the normally closed arrangement of the valve 10, the plunger 52 is biased outwardly by a helical coil spring 54 acting between an inner counterbore 56 of a plunger inner end 58 and a plug or stop 60. The spring 54 has sufficient strength to urge both the pilot valve 48 and the poppet 32 outwardly into the seated arrangement of FIG. 4.

The poppet orifice 47 provides a bleed passage for fluid communication between the side port 30 and a pilot chamber 62 defined by the poppet counterbore 44. Thus, in the normally closed position wherein the pilot valve 48 is closing the pilot opening 46, fluid pressure at the side port 30 is transmitted through the poppet orifice 47 into the pilot valve chamber 62 and acts to maintain the poppet valve 32 in the closed position illustrated in FIG. 4, in cooperation with the spring 54.

The pilot valve 48 is reciprocally moved from the seated position illustrated in FIG. 4 by suitable reciprocal, longitudinal movement of the plunger 52 inwardly toward the plug 60 under the control of a solenoid coil 64 of conventional construction. The stop 60 is secured as by a threaded connection at 66 to the housing sleeve end 18 and using a suitable locking compound Alternatively, according to an alternative embodiment, a plug 60' could be connected to a sleeve end 18' of a valve housing 12' as by a swaged connection 66', see FIG. 5.

A plug inner end 68 is threaded. A nut 70 is threaded to the threaded end 68 to clamp the solenoid coil 64 between the nut 70 and a flange 72 integral with the valve housing 12 at the sleeve end 18.

The plunger 52 is reciprocally slidable in the chamber 20 between the normally closed position of the valve illustrated in FIG. 4 and an open position of the valve wherein the plunger 52 is raised into abutment with the plug 60.

Energization of the coil 64 as by applying electrical power across conductors 74, see FIG. 1, creates a magnetic field in space occupied by the plunger 52 to cause the same to move inwardly against the force of the spring 54 until it abuts the plug 60. Inward movement of the plunger 52 which is integrally associated with the pilot valve 48 causes inward movement of the pilot valve 48 so as to unseat the needle end 50 from the poppet pilot hole 46. Thereafter, pressure at the side port 30 is greater than pressure at the pilot hole 46 and a lifting force moves the poppet 32 forward inwardly to provide fluid flow between the side ports 30 and the end port 26.

Advantageously, the valve housing 12 is of a non-magnetic material such as, for example, aluminum, brass, bronze or stainless steel. The use of such a non-magnetic material is believed less expensive than a magnetic material and eliminates the requirement for filters or screens in fluid ports, in use.

Figure 3:
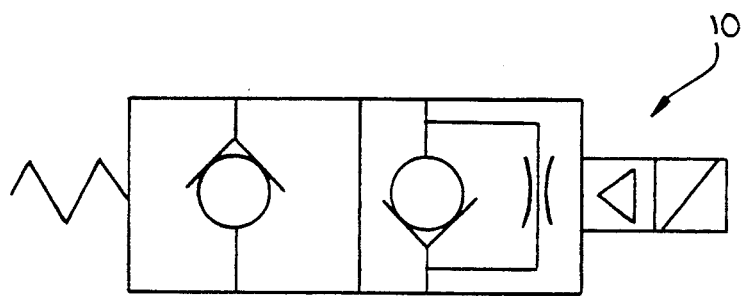
FIG. 3 is a hydraulic schematic of the valve of FIG. 1.

The valve 10 according to the invention is illustrated schematically in FIG. 3.

Thus, in accordance with the invention, there is disclosed a low cost solenoid operated cartridge valve suitable for use in high pressure applications. Economies of manufacturing are provided by the use of a one-piece valve housing which can be made as a screw machined part. A common bore is provided for the poppet, plunger and pilot valve. Further economies are obtained by using a pilot valve integrally formed with a plunger which results in use of less parts and more reliable control. The guiding length of the plunger is sufficient to minimize tilting of the pilot valve to maintain concentricity for guiding the pilot valve relative to the poppet pilot hole. This in connection with the one piece housing allows one common bore for guiding the plunger with the pilot and also the poppet.

I claim:

1. A solenoid operated cartridge valve, comprising:
an elongate one-piece cylindrical valve housing having an axial bore having a unitary inner diameter defining an interior chamber, one end of said housing comprising a port end including a plurality of port openings, and an axial opposite end comprising a sleeve end receivable in a solenoid, in use;

a valve member movable in said chamber at the port end between first and second valve positions for selectively coupling said port openings, said valve member having an axial pilot through bore defining a pilot chamber;

a solenoid plunger movable in said interior chamber at the sleeve end;

a pilot valve movable in said pilot chamber for selectively opening or closing said pilot through bore;

means for coupling said pilot valve to said plunger for axial movement therewith for selectively positioning said pilot valve and thus also said valve member;

a stop mounted to said valve housing at the sleeve end for retaining the plunger in said chamber; and biasing means operatively associated with said plunger for normally maintaining said valve member in one of said first and second valve positions, said valve member, said plunger, said pilot valve and at least a portion of said stop being enclosed in said bore defining the interior chamber to maintain precise alignment of said valve member, said plunger and said pilot valve of all times therein.

2. The cartridge valve of claim 1 wherein said plunger and said pilot valve are both guided in said valve housing axial bore.

3. The cartridge valve of claim 1 wherein said pilot through opening comprises a relatively large diameter counterbore opening into said chamber coupled to a relatively small diameter coaxial pilot hole adjacent said housing port end.

4. The cartridge valve of claim 3 wherein said pilot valve is loosely received in said counterbore and said pilot valve has a needle end received in said pilot hole for selectively opening or closing said pilot hole.

5. The cartridge valve of claim 4 wherein said plunger is an elongate plunger having an outer diameter slightly less than an inner diameter of said housing through bore to maintain said plunger centered in said valve housing so that said pilot valve needle end is concentric with said pilot hole.

6. The cartridge valve of claim 1 wherein said valve housing is of non-magnetic material.

7. The cartridge valve of claim 1 wherein said biasing means comprises a spring received in said chamber and acting between said stop and said plunger for normally maintaining said valve member in one of said first and second valve positions.

8. The cartridge valve of claim 1 wherein said stop is threadably mounted to said valve housing at the sleeve end.

9. The cartridge valve of claim 1 wherein said stop is swaged to said valve housing at the sleeve end.

10. The cartridge valve of claim 1 wherein said pilot through opening is concentric with an outer diameter of said valve member.

11. A two position solenoid operated cartridge valve comprising:
an elongate one-piece cylindrical valve housing having an axial counterbore at a sleeve end having a unitary inner diameter defining an interior chamber, an axial opposite port end of said housing having an axial through bore opening to said interior chamber to provide an end port opening and defining a valve seat, and a radially extending through opening in said housing opening into said interior chamber and defining a side port opening, said sleeve end being receivable in a solenoid, in use;

a valve member movable in said chamber between a first valve position seated on said valve seat for selectively preventing coupling between said end and side port openings and a second valve position spaced from said valve seat for coupling said end and side port openings, said valve member having an axial pilot through bore defining a pilot chamber;

a solenoid plunger movable in said interior chamber at the sleeve end;

a pilot valve movable in said pilot chamber for selectively opening or closing said pilot through bore;

means for coupling said pilot valve to said plunger for axial movement therewith for selectively positioning said pilot valve and thus also said valve member;

a stop mounted to said valve housing at the sleeve end for retaining the plunger in said chamber; and biasing means operatively associated with said plunger for normally maintaining said valve member in one of said first and second valve positions, said valve member, said plunger, said pilot valve and at least a portion of said stop being enclosed in said bore defining the interior chamber to maintain precise alignment of said valve member, said plunger and said pilot valve at all times therein.

12. The cartridge valve of claim 11 wherein said plunger and said pilot valve are both guided in said valve housing axial counterbore.

13. The cartridge valve of claim 11 wherein said pilot through opening comprises a relatively large diameter counterbore opening into said chamber coupled to a relatively small diameter coaxial pilot hole adjacent said housing port end.

14. The cartridge valve of claim 13 wherein said pilot valve is loosely received in said counterbore and said pilot valve has a needle end received in said pilot hole for selectively opening or closing said pilot hole.

15. The cartridge valve of claim 14 wherein said plunger is an elongate plunger having an outer diameter slightly less than an inner diameter of said housing through bore to maintain said plunger centered in said valve housing so that said pilot valve needle end is concentric with said pilot hole.

16. The cartridge valve of claim 11 wherein said valve housing is of non-magnetic material.

17. The cartridge valve of claim 11 wherein said biasing means comprises a spring received in said chamber and acting between said stop and said plunger for normally maintaining said valve member in one of said first and second valve positions.

18. The cartridge valve of claim 11 wherein said stop is threadably mounted to said valve housing at the sleeve end.

19. The cartridge valve of claim 11 wherein said stop is swaged to said valve housing at the sleeve end.

20. The cartridge valve of claim 11 wherein said pilot through opening is concentric with an outer diameter of said valve member.

* * * * *